Patented Feb. 23, 1943

2,312,048

UNITED STATES PATENT OFFICE 2,312,048

PROCESS FOR THE MANUFACTURE OF HYDROFLUOSILICIC ACID

Walker Penfield, Swarthmore, Pa., assignor to The Pennsylvania Salt Manufacturing Company, Philadelphia, Pa., a corporation of Pennsylvania No Drawing. Application June 20, 1941,
Serial No. 398,915

4 Claims. (Cl. 23—153)

This invention relates to an improved method for the production of hydrofluosilicic acid from silicon tetrafluoride resulting from an acid digestion of fluorine-bearing materials in the presence of silica-bearing material or sand.

In U. S. Pat. No. 1,938,533 there is set forth a process for the manufacture of hydrofluosilicic acid, particularly from den or mixer gas resulting from the digestion with sulphuric acid of phosphate rock in the production of phosphate fertilizers.

According to that process a stream containing silicon tetrafluoride and water vapor is condensed in a tower in which it is contacted with hydrofluosilicic acid. During this operation there is precipitated a hydrated silica which is formed simultaneously with the hydrofluosilicic acid in accordance wth the equation $$3SiF_4 + 4H_2O \rightarrow 2H_2SiF_6 + SiO_2.2H_2O$$

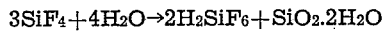

It has been found after separation of the hydrated silica from the hydrofluosilicic acid by filtration that the filter cake contains an appreciable quantity of acid.

It is an object of this invention to recover the acid from the separated filter cake.

Another object of the invention is to provide a more economical process for the manufacture of hydrofluosilicic acid without the addition to the process of any reaction or heated vessels.

Other objects and advantages of this invention will be apparent upon a consideration of the specification and claims.

According to this invention the filter-cake is fed into the den or mixer wherein the acid digestion is effected.

In one plant run, where the analysis of the filter cake showed it to contain about 17.6% of hydrofluosilicic acid, the yield of acid was increased by 17.5% by adding the filter cake to subsequent digestion operations in the manufacture of phosphate fertilizer.

It has been found that the filter cake may be added by increments during the course of acidulation of the phosphate rock, thereby making use of the exothermic heat of the reaction to liberate the hydrofluosilicic acid, although additional heat may be supplied if desired.

While the invention has been described as embodied in a phosphate fertilizer operation, it should be noted that it may be practised in a process for the manufacture of hydrofluosilicic acid from silica and hydrofluoric acid and, therefore, is not limited to that described; the essence of the invention being the recovery of the acid from the filter cake by feeding the same into the den, mixer or chamber wherein the fluorine-containing material is treated to yield vapors containing silicon tetrafluoride.

When desired the den or mixer gas may be reacted with water to form hydrofluosilicic acid.

I claim:

1. A process for the manufacture of hydrofluosilicic acid comprising digesting a fluorine-containing material with an acid in the presence of silica to liberate silicon tetrafluoride; contacting the liberated silicon tetrafluoride with water to form hydrofluosilicic acid and hydrated silica containing retained hydrofluosilicic acid; separating the unretained portion of the hydrofluosilicic acid from the hydrated silica; and feeding the hydrofluosilicic acid retained in the hydrated silica to the digestion operation by feeding the hydrated silica to said operation.

2. In the process for the manufacture of phosphate fertilizer from phosphate rock and sulphuric acid wherein the rock is digested with the acid liberating gases containing silicon tetrafluoride which is contacted with water to form hydrofluosilicic acid and hydrated silica containing retained hydrofluosilicic acid and wheren the unretained portion of the hydrofluosilicic acid is separated from the hydrated silica the step of feeding the retained hydrofluosilicic acid to the digestion operation by feeding the hydrated silica to said operation.

3. The process according to claim 1 wherein aqueous hydrofluosilicic acid is used in place of water.

4. The process according to claim 2 wherein aqueous hydrofluosilicic acid is used in place of water.

WALKER PENFIELD.